United States Patent
Yamashita et al.

[11] 4,037,938
[45] July 26, 1977

[54] RETROFOCUS-TYPE OBJECTIVE FOR ENDOSCOPES

[75] Inventors: Nobuo Yamashita, Tama; Toshihiro Imai, Hachiouji, both of Japan

[73] Assignee: Olympus Optical Co., Ltd., Japan

[21] Appl. No.: 635,424

[22] Filed: Nov. 26, 1975

[30] Foreign Application Priority Data

Nov. 27, 1974  Japan .................................. 49-136922

[51] Int. Cl.² ............................................... G02B 13/04
[52] U.S. Cl. ................................. 350/202; 350/208; 350/220; 350/225
[58] Field of Search ............... 350/202, 225, 220, 204, 350/208

[56] References Cited

U.S. PATENT DOCUMENTS

| | | | |
|---|---|---|---|
| 2,933,018 | 4/1960 | Sandbach | 350/225 |
| 3,829,198 | 8/1974 | Takahashi | 350/220 |

*Primary Examiner*—John K. Corbin
*Assistant Examiner*—Conrad Clark
*Attorney, Agent, or Firm*—Cushman, Darby & Cushman

[57] ABSTRACT

A compact retrofocus-type wide-angle objective for endoscopes comprising a front diverging lens group comprising a lens having negative power and a rear converging lens group comprising a positive lens on which absolute value of radius of curvature on the object side surface is larger than that on the image side surface and a cemented positive doublet lens whose cemented surface has negative refractive power.

13 Claims, 54 Drawing Figures

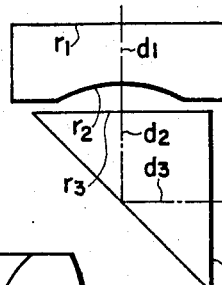
FIG. 5
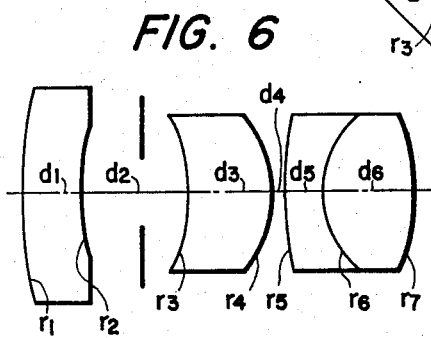
FIG. 6
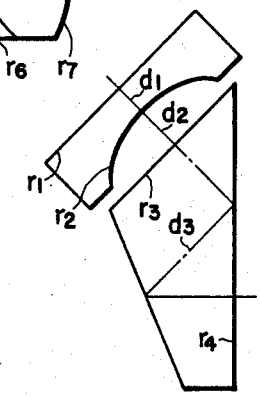
FIG. 7
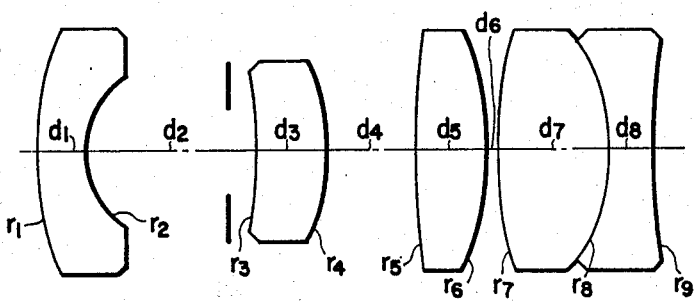
FIG. 8
FIG. 9
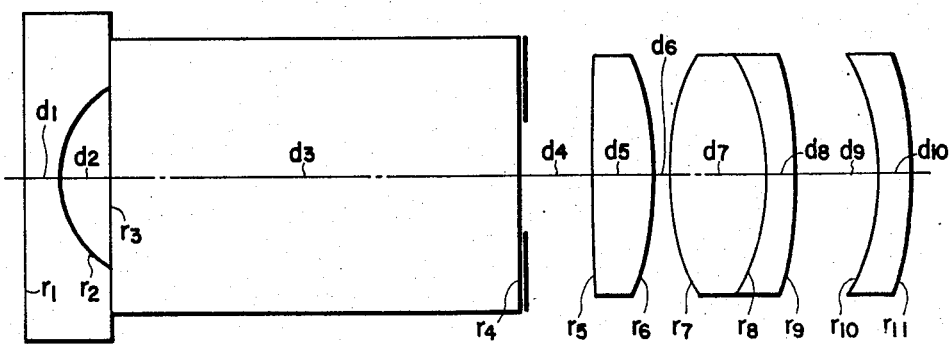

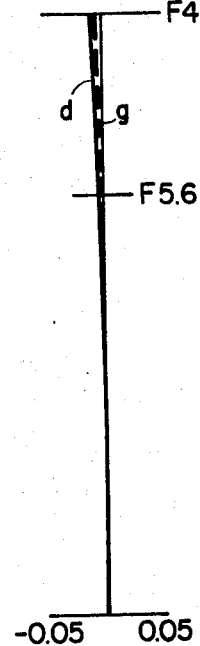 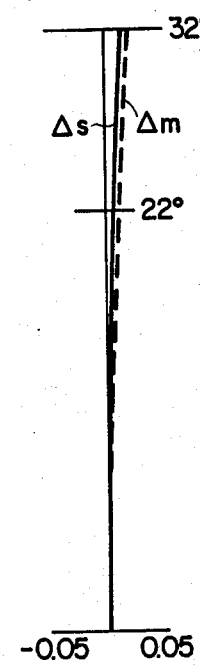 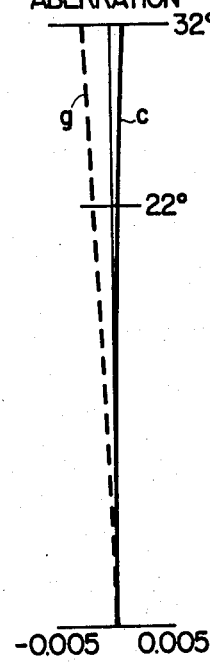 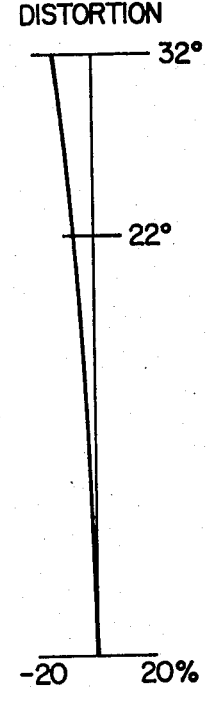
FIG. 10A SPHERICAL ABERRATION  FIG. 10B ASTIGMATISM  FIG. 10C LATERAL CHROMATIC ABERRATION  FIG. 10D DISTORTION
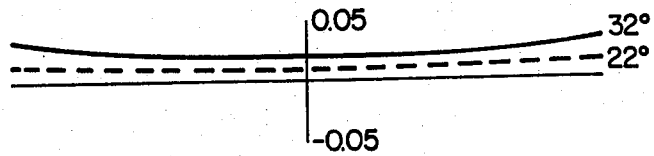
FIG. 10E
OFFAXIAL SPHERICAL ABERRATION (MERIDIONAL)

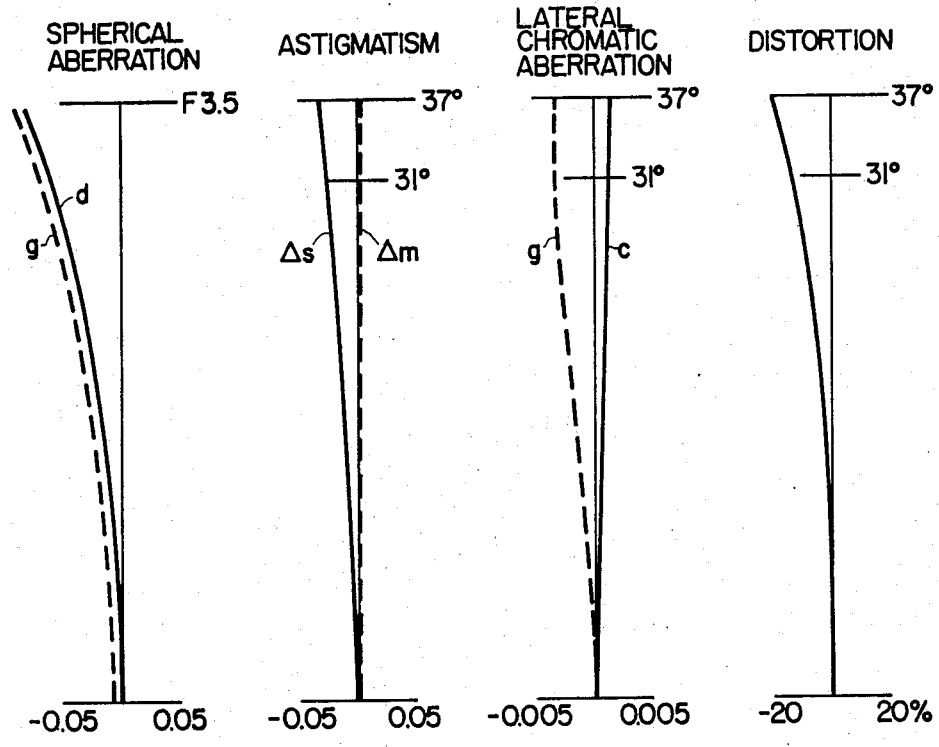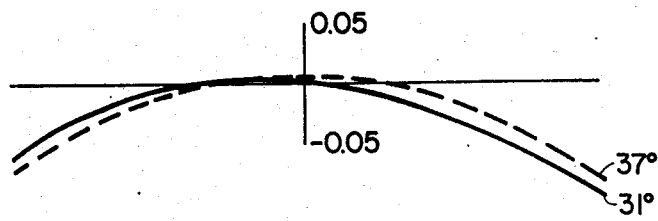

FIG. 12A
SPHERICAL ABERRATION
FIG. 12B
ASTIGMATISM
FIG. 12C
LATERAL CHROMATIC ABERRATION
FIG. 12D
DISTORTION
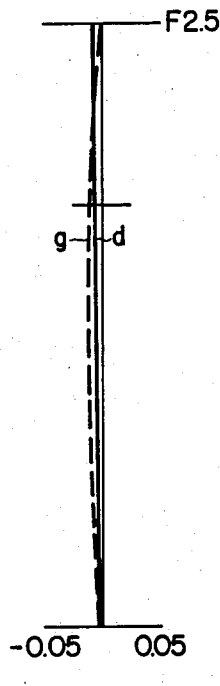
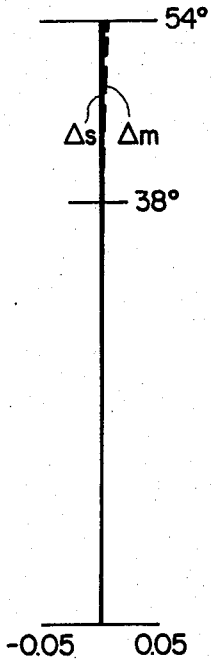
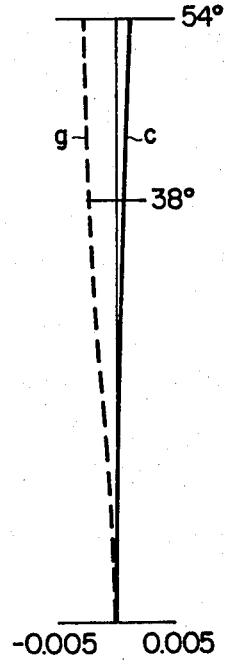
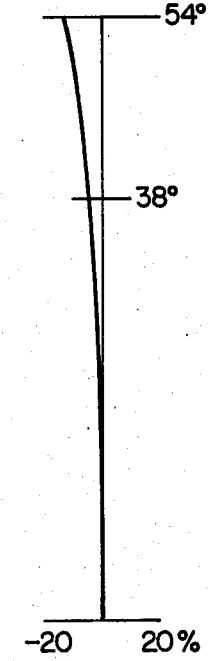
FIG. 12E
OFFAXIAL SPHERICAL ABERRATION (MERIDIONAL)
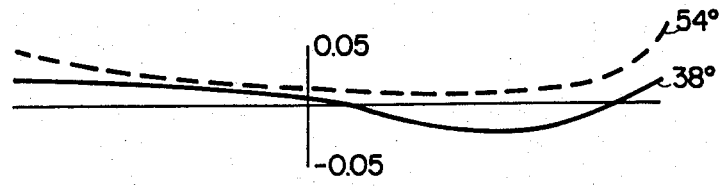

FIG. 13A — SPHERICAL ABERRATION
FIG. 13B — ASTIGMATISM
FIG. 13C — LATERAL CHROMATIC ABERRATION
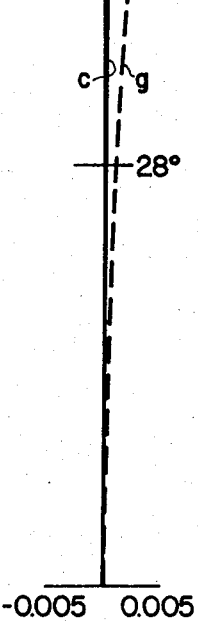
FIG. 13D — DISTORTION
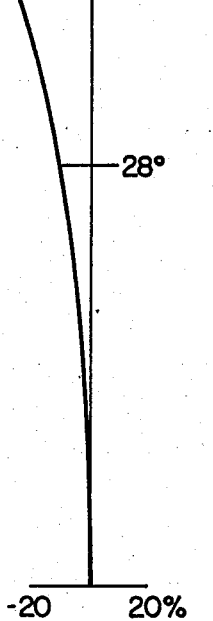
FIG. 13E — OFFAXIAL SPHERICAL ABERRATION (MERIDIONAL)
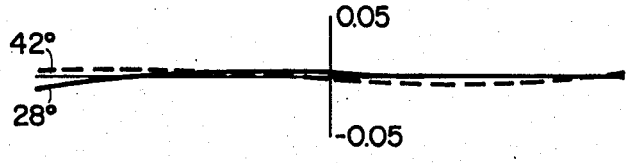

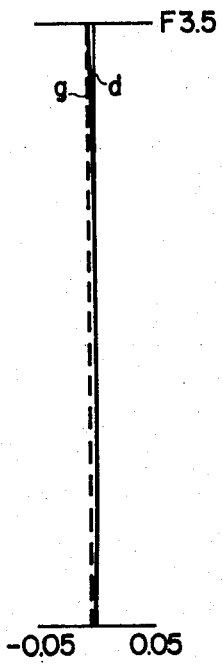
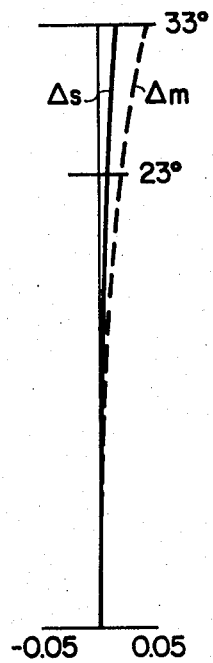
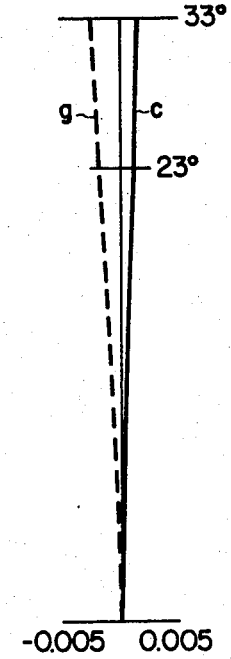
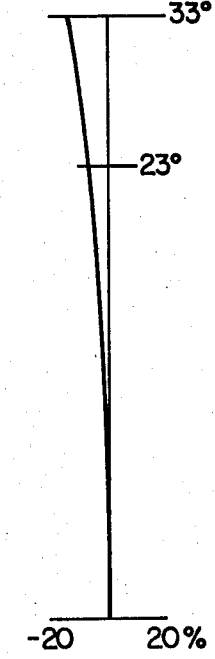
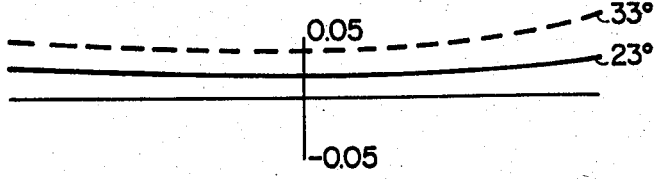

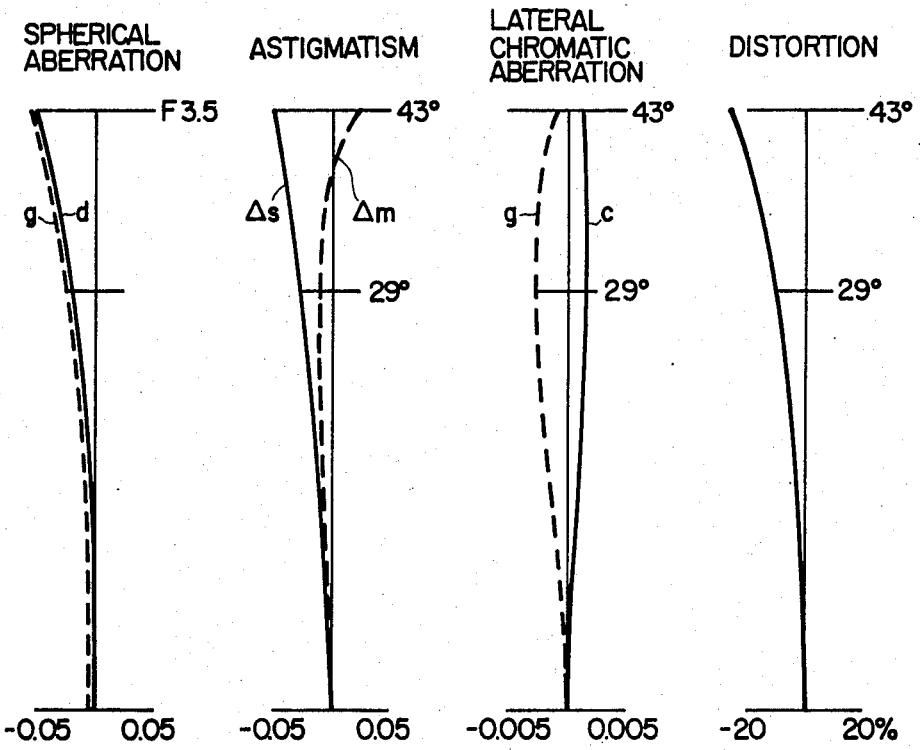
FIG. 15A SPHERICAL ABERRATION
FIG. 15B ASTIGMATISM
FIG. 15C LATERAL CHROMATIC ABERRATION
FIG. 15D DISTORTION
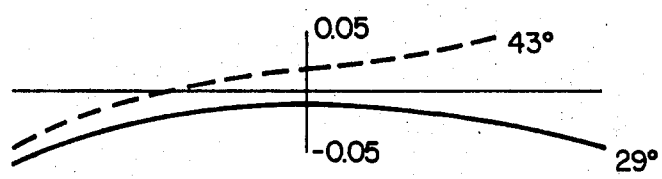
FIG. 15E
OFFAXIAL SPHERICAL ABERRATION (MERIDIONAL)

FIG. 16A  FIG. 16B  FIG. 16C  FIG. 16D
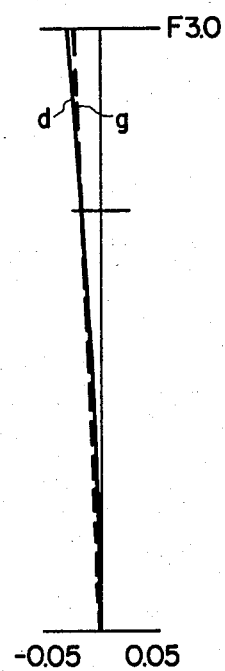
SPHERICAL ABERRATION
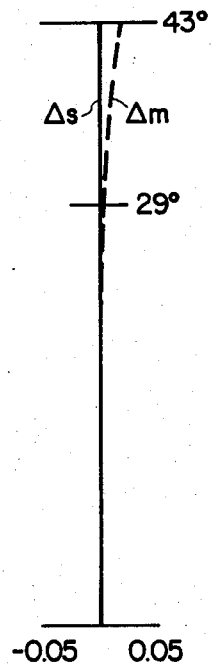
ASTIGMATISM
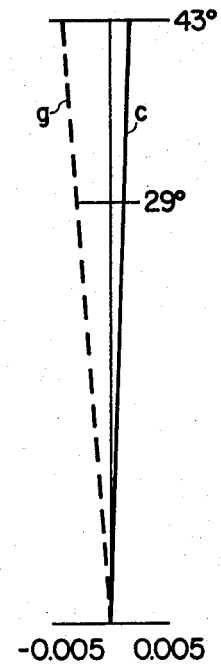
LATERAL CHROMATIC ABERRATION
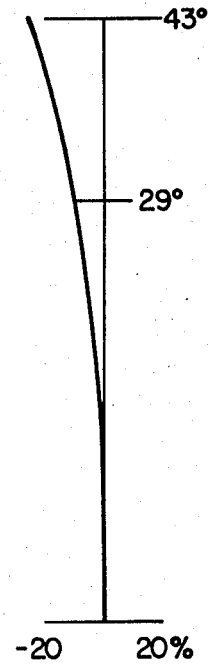
DISTORTION
FIG. 16E
OFFAXIAL SPHERICAL ABERRATION (MERIDIONAL)
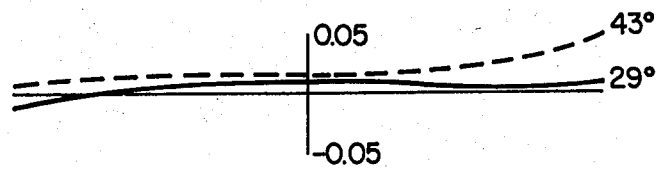

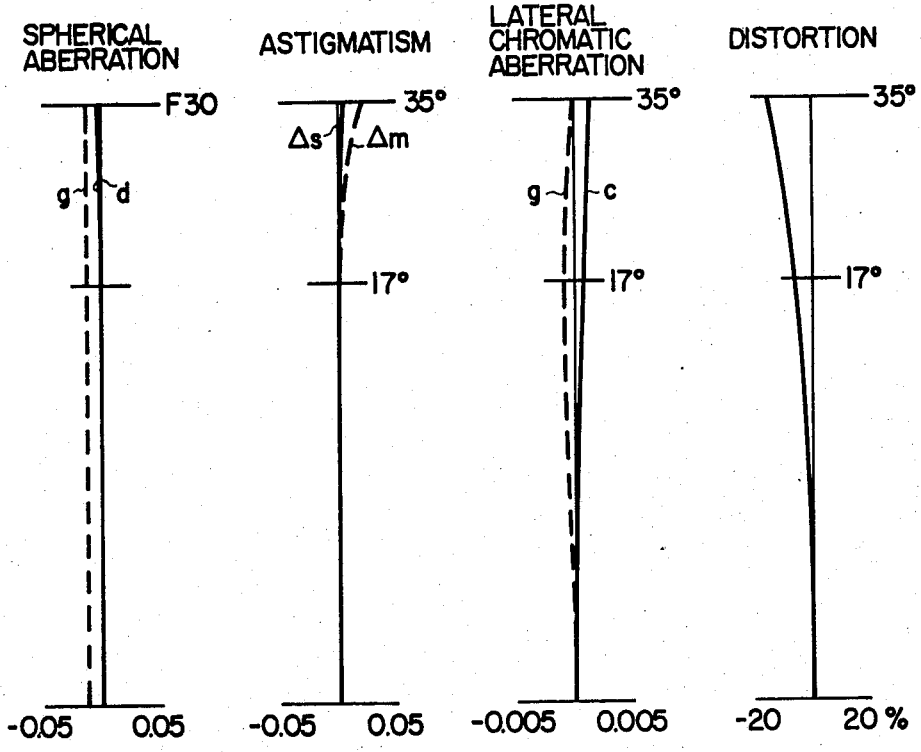
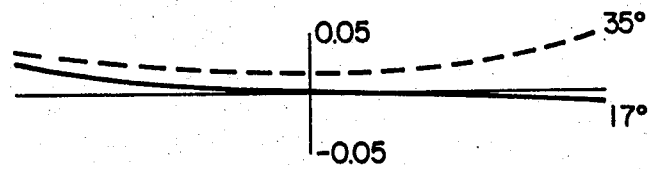

SPHERICAL ABERRATION

ASTIGMATISM

LATERAL CHROMATIC ABERRATION

DISTORTION

OFFAXIAL SPHERICAL ABERRATION (MERIDIONAL)

RETROFOCUS-TYPE OBJECTIVE FOR ENDOSCOPES

BACKGROUND OF THE INVENTION a. Field of the Invention

The present invention relates to an objective for endoscopes and, more particularly, to a retrofocus-type objective comprising a front diverging lens group and a rear converging lens group.

b. Description of the Prior Art

Most of conventional objectives for endoscopes comprised only one, two or three lenses since it was rather difficult to machine and assemble plural lenses having diameter small enough to be accommodated in this distal ends of endoscopes. Of the rays incident on an image fiber bundle, on the other hand, those having large angles of incidence can not reach the other end of the image fiber bundle due to optical leakage from the image fiber bundle. In order to minimize such optical leakage of the incident rays, it is therefore necessary to make the incident rays as parallel as possible. For achieving this purpose, a stop is arranged in front of the objective when an objective comprising only one lens is adopted for endoscopes. Such a stop is also employed for objectives for endoscopes even when they comprises two or three lenses.

In case of endoscopes for side viewing, a prism is placed in front of the stop which is arranged in front of the above-mentioned objective. When a wide angle of field is desired, however, the prism must unavoidably have dimensions too large to be arranged in a thin distal end of endoscopes.

Further, a large prism will inevitably require a large cover glass consequently.

SUMMARY OF THE INVENTION

It is, therefore, a primary object of the present invention to provide a compact retrofocus-type objective for endoscopes which can have a large angle of field and comprises a front diverging lens group and a rear converging lens group.

The front diverging lens group of the objective according to the present invention comprising a negative meniscus lens which has plane or convex object side surface also serving as a cover glass, and the rear converging lens group comprising, in its standard configuration, a positive lens and a positive cemented doublet lens. Further, an aperture stop is arranged in front, preferably in the vicinity, of the object side surface of the lens nearest the object of the rear group so that rays will fall as perpendicularly as possible on the end face of the image fiber bundle for obtaining a high efficiency-to-angle characteristic. In general retrofocus-type objectives, spherical aberration and lateral chromatic aberration are aggravated though curvature of field can favorably be corrected over a wide image plane. According to the present invention, the object side positive lens of the rear converging lens group is designed in such a manner that absolute value of the radius of curvature on its object side surface is larger than that of the image side surface as defined in condition (1) below. In combination with the positive cemented lens in the rear converging lens group, this object side positive lens is effective to favorably correct spherical aberration and lateral chromatic aberration. The objective for endoscopes according to the present invention is characterized in that it has a lens configuration as described above and, at the same time, can satisfy the conditions (1) through (4) which are defined below:

$$|r_0| > |r_0'| \tag{1}$$

$$0.8 \leq m \leq 2.5 \tag{2}$$

$$0.3 \leq \left| f \left( \frac{1}{f_1} + (n_0 - 1)\frac{1}{r_0} \right) \right| \leq 1.2 \tag{3}$$

$$0.3 \leq f \frac{1}{|r_a|} \leq 1.5 \tag{4}$$

wherein the reference symbols represent as listed below:

$m$: ratio of total focal length of the rear converging lens group relative to the total focal length of the entire lens system $f$: total focal length of the entire lens system $f_1$: focal length of the front lens group $n_0$: refractive index of the positive lens in the rear lens group $r_0$ and $r_0'$: radii of curvature on the respective front and rear surfaces of the positive lens in the rear lens group $r_a$: radius of curvature on the cemented surface of the positive cemented lens in the rear group Now, the significance of the above-mentioned conditions for the objective for endoscopes according to the present invention will be described consecutively below:

When the factor $m$ exceeds the upper limit of the condition (2), the conjugate distance of the rear converging lens group is extended in proportion to its focal length to unavoidably prolong the total length of the objective. Such an objective will be undesirable for endoscopes since it obliges to design a long distal end of a endoscope which will make patients feel much pains. When $m$ is smaller than the lower limit of the condition (2), that is to say, when the total focal length of the rear converging lens group is smaller with the height of incident ray kept constant on the rear converging lens group, angle of incidence on the rear converging lens group becomes wider and curvature of image is so aggravated as to make the objective unusable for endoscopes.

The conditions (3) and (4) are necessary for improving symmetry of coma while favorably correcting meridional astigmatism at the same time. In correcting offaxial spherical aberration, the condition (3) is most effective for lower ray and then for principal ray and least effective for upper ray. The condition (4) is, in contrast, most effective for upper ray, then for principal ray and least for lower ray in correcting offaxial spherical aberration. When the factors $$\left| f \left( \frac{1}{f_1} + (n_0 - 1)\frac{1}{r_0} \right) \right| \text{ and } f \frac{1}{|r_a|}$$

exceed the upper limits of the conditions (3) and (4), it is impossible to favorably improve symmetry of coma though astigmatism can be corrected. Speaking more concretely, when $$f\left(\frac{1}{f_1} + (n_0 - 1)\frac{1}{r_0}\right)$$

exceeds the upper limit of the condition (3), offaxial spherical aberration of lower ray is overcorrected and that of upper ray is undercorrected. If $$f\frac{1}{|r_a|}$$

exceeds the upper limit of the condition (4), on the other hand, offaxial spherical aberration of lower ray is undercorrected and that of upper ray is overcorrected. When $$f\left(\frac{1}{f_1} + (n_0 - 1)\frac{1}{r_0}\right) \text{ and } f\frac{1}{|r_a|}$$

are below the lower limits of the condition (3) and (4), meridional astigmatism is undercorrected. When either factor $$f\left(\frac{1}{f_1} + (n_0 - 1)\frac{1}{r_0}\right) \text{ or } f\frac{1}{|r_a|}$$

is below the lower limit of the condition (3) or (4), meridional astigmatism can be corrected by increasing the other factor to a value close to the upper limit of the other condition, but such a measure will degrade symmetry of coma to make the objective unusable for endoscopes.

In order to correct a specific aberration further favorably without changing widely the fundamental lens configuration of the objective for endoscopes according to the present invention, it is possible to contrive such variants as are described in the following:

As one of the variants, it is possible to correct spherical aberration further favorably by additionally arranging, as a component of said rear lens group, a positive lens in front of the rear converging lens group of the fundamental configuration described above. In contrast, it is also possible to facilitate correction of lateral chromatic aberration by arranging, as a component of said rear lens group, a negative lens at the back the rear converging lens group.

Furthermore, the objective for endoscopes according to the present invention make it possible to adopt a method which permits changing the airspace between the front and rear lens groups by moving the rear lens group relative to the front lens group without advancing the lens system as a whole. Since this method does not require moving the front lens group for changing the airspace, it makes it possible to make the front lens group usable as a cover glass and, therefore, offers an advantage to design compact distal ends of endoscopes. In the variants described above, the objective can be focused simply by moving the positive or negative lens which is additionally arranged in front or at the back of the rear lens group. In addition, this method provides further advantages to make it possible to focus the objective on objects located at shorter distances and to shorten the moving distance required for focusing of the objective.

BRIEF DESCRIPTION OF THE DRAWINGS

FIG. 1 through FIG. 9 illustrate sectional views of the preferred embodiments of the objective for endoscopes according to the present invention;

FIG. 10A through FIG. 10E illustrate curves showing the aberration characteristic of the embodiment 1;

FIG. 11A through FIG. 11E show graphs illustrating the aberration characteristic of the embodiment 2;

FIG. 12A through FIG. 12E show graphs illustrating the aberration characteristic of the embodiment 3;

FIG. 13A through FIG. 13E illustrate curves showing the aberration characteristic of the embodiment 4;

FIG. 14A through FIG. 14E show curves illustrating the aberration characteristic of the embodiment 5;

FIG. 15A through FIG. 15E show graphs illustrating the aberration characteristic of the embodiment 6;

FIG. 16A through FIG. 16E illustrate graphs showing the aberration characteristic of the embodiment 7;

FIG. 17A through FIG. 17E show curves illustrating the aberration characteristic of the embodiment 8.

DETAILED DESCRIPTION OF THE PREFERRED EMBODIMENTS

Figure 1:
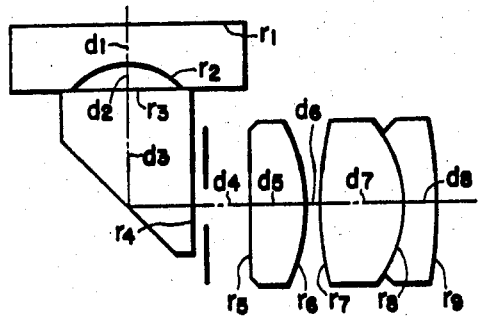
Figure 2:
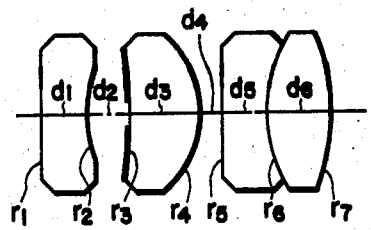
Figure 3:
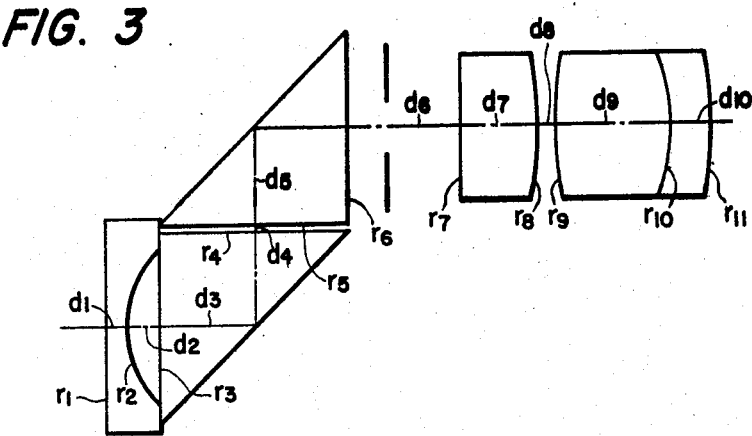
Figure 4:
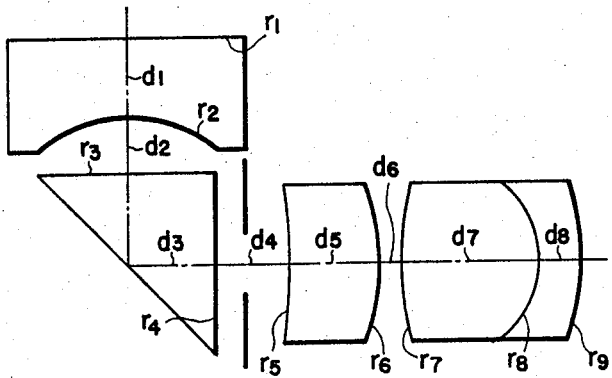

Numerical data of some preferred embodiments of the retrofocus-type objective for endoscopes according to the present invention will be exemplified below:

Embodiment 1

| | | |
|---|---|---|
| $r_1 = \infty$ | | |
| $d_1 = 0.37$ | $n_1 = 1.51633$ | $\nu_1 = 64.15$ |
| $r_2 = 0.641$ | | |
| $d_2 = 0.21$ | | |
| $r_3 = \infty$ | | |
| $d_3 = 1.60$ | $n_2 = 1.8061$ | $\nu_2 = 40.92$ |
| $r_4 = \infty$ | | |
| $d_4 = 0.50$ | | |
| $r_5 = \infty$ | | |
| $d_5 = 0.53$ | $n_3 = 1.69680$ | $\nu_3 = 55.62$ |
| $r_6 = -1.559$ | | |
| $d_6 = 0.11$ | | |
| $r_7 = 3.155$ | | |
| $d_7 = 0.80$ | $n_4 = 1.62041$ | $\nu_4 = 60.27$ |
| $r_8 = -1.084$ | | |
| $d_8 = 0.27$ | $n_5 = 1.78472$ | $\nu_5 = 25.71$ |
| $r_9 = -3.226$ | | |

$$f = 1, \, m = 1.485, \, \frac{f}{|r_a|} = 0.922$$

$$f\left(\frac{1}{f_1} + (n_0 - 1)\frac{1}{r_0}\right) = -0.806$$

wherein the reference symbols denote as defined below:

$r_1$ through $R_9$: radii of curvature of respective lens elements $d_1$ through $d_8$: thickness of respective lens elements and airspace $n_1$ through $n_5$: refractive indices of respective lens elements $\nu_1$ through $\nu_5$: Abbe's numbers of respective lens elements Embodiment 2

| | | |
|---|---|---|
| $r_1 = \infty$ | | |
| $d_1 = 0.37$ | $n_1 = 1.51633$ | $\nu_1 = 64.15$ |
| $r_2 = 1.13$ | | |
| $d_2 = 0.36$ | | |
| $r_3 = -2.294$ | | |
| $d_3 = 0.60$ | $n_2 = 1.757$ | $\nu_2 = 47.87$ |
| $r_4 = -0.816$ | | |
| $d_4 = 0.20$ | | |

-continued

Embodiment 2

$r_5 = \infty$
$\quad d_5 = 0.35 \quad n_3 = 1.84666 \quad \nu_3 = 23.88$
$r_6 = 1.13$
$\quad d_6 = 0.61 \quad n_4 = 1.788 \quad \nu_4 = 47.49$
$r_7 = -1.564$
$\quad f = 1, m = 1.03, \dfrac{f}{|r_a|} = 0.883$ $$f\left\{\dfrac{1}{f_1} + (n_0 - 1)\dfrac{1}{r_0}\right\} = -0.789$$

wherein the reference symbols denote as defined below:
$r_1$ through $r_7$: radii of curvature of respective lens elements
$d_1$ through $d_6$: thickness of respective lens elements and airspace
$n_1$ through $n_4$: refractive indices of respective lens elements
$\nu_1$ through $\nu_4$: Abbe's numbers of respective lens elements Embodiment 3

$r_1 = \infty$
$\quad d_1 = 0.199 \quad n_1 = 1.51633 \quad \nu_1 = 64.1$
$r_2 = 0.924$
$\quad d_2\ 1.926\ 0.266$
$r_3 = \infty$
$\quad d_3 = 1.594 \quad n_2 = 1.8061 \quad \nu_2 = 40.9$
$r_4 = \infty$
$\quad d_4 = 0.066$
$r_5 = \infty$
$\quad d_5 = 1.461 \quad n_3 = 1.8061 \quad \nu_3 = 40.9$
$r_6 = \infty$
$\quad d_6 = 0.946$
$r_7 = \infty$
$\quad d_7 = 0.664 \quad n_4 = 1.6968 \quad \nu_4 = 55.5$
$r_8 = -2.716$
$\quad d_8 = 0.133$
$r_9 = 2.59$
$\quad d_9 = 0.996 \quad n_5 = 1.62041 \quad \nu_5 = 60.3$
$r_{10} = -1.454$
$\quad d_{10} = 0.332 \quad n_6 = 1.78472 \quad \nu_6 = 25.7$
$r_{11} = -4.343$
$\quad f = 1, m = 1,926, \dfrac{f}{|r_a|} = 0.688$ $$f\left\{\dfrac{1}{f_1} + (n_0 - 1)\dfrac{1}{r_0}\right\} = -0.559$$

wherein the reference symbols denote as defined below:
$r_1$ through $r_{11}$: radii of curvature of respective lens elements
$d_1$ through $d_{10}$: thickness of respective lens elements and airspace
$n_1$ through $n_6$: refractive indices of respective lens elements
$\nu_1$ through $\nu_6$: Abbe's numbers of respective lens elements Embodiment 4

$r_1 = \infty$
$\quad d_1 = 0.66 \quad n_1 = 1.51633 \quad \nu_1 = 64.15$
$r_2 = 1.126$
$\quad d_2 = 0.46$
$r_3 = \infty$
$\quad d_3 = 4.04 \quad n_2 = 1.8061 \quad \nu_2 = 40.92$
$r_4 = \infty$
$\quad d_4 = 0.60$
$r_5 = -4.989$
$\quad d_5 = 0.77 \quad n_3 = 1.6968 \quad \nu_3 = 55.52$
$r_6 = -2.125$
$\quad d_6 = 0.17$
$r_7 = 2.066$
$\quad d_7 = 1.17 \quad n_4 = 1.62041 \quad \nu_3 = 60.27$
$r_8 = -1.6$
$\quad d_8 = 0.37 \quad n_5 = 1.84666 \quad \nu_5 = 23.88$ -continued Embodiment 4

$r_9 = -5.707$
$\quad f = 1, m = 1.960, \dfrac{f}{|r_a|} = 0.625$ $$f\left\{\dfrac{1}{f_1} + (n_0 - 1)\dfrac{1}{r_0}\right\} = -0.598$$

wherein the reference symbols denote as defined below:
$r_1$ through $r_9$: radii of curvature of respective lens elements
$d_1$ through $d_8$: thickness of respective lens elements and airspace
$n_1$ through $n_5$: refractive indices of respective lens elements
$\nu_1$ through $\nu_5$: Abbe's numbers of respective lens elements Embodiment 5

$r_1 = \infty$
$\quad d_1 = 0.52 \quad n_1 = 1.51633 \quad \nu_1 = 64.15$
$r_2 = 0.930$
$\quad d_2 = 0.22$
$r_3\ \infty$
$\quad d_3 = 3.13 \quad n_2 = 0\ 1.83481 \quad \nu_2 = 42.82$
$r_4 = \infty$
$\quad d_4 = 0.96$
$r_5 = 137.877$
$\quad d_5 = 0.74 \quad n_3 = 1.69680 \quad \nu_3 = 55.62$
$r_6 = -2.505$
$\quad d_6 = 0.15$
$r_7 = 2.505$
$\quad d_7 = 1.11 \quad n_4 = 1.62041 \quad \nu_4 = 60.27$
$r_8 = -1.419$
$\quad d_8 = 0.37 \quad n_5 = 1.78472 \quad \nu_5 = 25.71$
$r_9 = -5.122$
$\quad f = 1, m = 1.895, \dfrac{f}{|r_a|} = 0.705$ $$f\left\{\dfrac{1}{f_1} + (n_0 - 1)\dfrac{1}{r_0}\right\} = -0.550$$

wherein the reference symbols denote as defined below:
$r_1$ through $r_9$: radii of curvature of respective lens elements
$d_1$ through $d_8$: thickness of respective lens elements and airspace
$n_1$ through $n_5$: refractive indices of respective lens elements
$\nu_1$ through $\nu_5$: Abbe's numbers of respective lens elements Embodiment 6

$r_1 = 13.908$
$\quad d_1 = 0.32 \quad n_1 = 1.51633 \quad \nu_1 = 64.15$
$r_2 = 2.111$
$\quad d_2 = 0.92$
$r_3 = -1.366$
$\quad d_3 = 0.69 \quad n_2 = 1.757 \quad \nu_2 = 47.87$
$r_4 = -1.042$
$\quad d_4 = 0.09$
$r_5 = 3.688$
$\quad d_5 = 0.32 \quad n_3 = 1.84666 \quad \nu_3 = 23.88$
$r_6 = 0.883$
$\quad d_6 = 0.78 \quad n_4 = 1.788 \quad \nu_4 = 47.49$
$r_7 = -1.831$
$\quad f = 1, m = 1.116, \dfrac{f}{|r_a|} = 1.132$ $$f\left\{\dfrac{1}{f_1} + (n_0 - 1)\dfrac{1}{r_0}\right\} = -0.760$$

wherein the reference symbols denote as defined below:

$r_1$ through $r_7$: radii of curvature of respective lens elements $d_1$ through $d_6$: thickness of respective lens elements and airspace $n_1$ through $n_4$: refractive indices of respective lens elements $\nu_1$ through $\nu_4$: Abbe's numbers of respective lens elements

Embodiment 7

$r_1 = \infty$
$\quad d_1 = 0.28 \quad n_1 = 1.51633 \quad \nu_1 = 64.15$
$r_2 = 1.040$
$\quad d_2 = 0.37$
$r_3 = \infty$
$\quad d_3 = 3.33 \quad n_2 = 1.8061 \quad \nu_2 = 40.92$
$r_4 = \infty$
$\quad d_4 = 0.79$
$r_5 = -60.625$
$\quad d_5 = 0.46 \quad n_3 = 1.6968 \quad \nu_3 = 55.62$
$r_6 = -2.543$
$\quad d_6 = 0.09$
$r_7 = 2.964$
$\quad d_6 = 0.74 \quad n_4 = 1.62041 \quad \nu_4 = 60.27$
$r_8 = -1.419$
$\quad d_8 = 0.23 \quad n_5 = 1.84666 \quad \nu_5 = 23.88$
$r_9 = -3.043$ $f = 1, \ m = 1.828, \ \dfrac{f}{|r_a|} = 0.705$ $f\left\{\dfrac{1}{f_1} + (n_0 - 1)\dfrac{1}{r_0}\right\} = -0.508$ wherein the reference symbols denote as defined below:

$r_1$ through $r_9$: radii of curvature of respective lens elements $d_1$ through $d_8$: thickness of respective lens elements and airspace $n_1$ through $n_5$: refractive indices of respective lens elements $\nu_1$ through $\nu_5$: Abbe's numbers of respective lens elements

Embodiment 8

$r_1 = 2.763$
$\quad d_1 = 0.28 \quad n_1 = 1.51633 \quad \nu_1 = 64.15$
$r_2 = 0.580$
$\quad d_2 = 1.18$
$r_3 = -2.817$
$\quad d_3 = 0.48 \quad n_2 = 1.6968 \quad \nu_2 = 55.52$
$r_4 = -1.430$
$\quad d_4 = 0.60$
$r_5 = 7.885$
$\quad d_5 = 0.48 \quad n_3 = 1.6968 \quad \nu_3 = 55.52$
$r_6 = -2.338$
$\quad d_6 = 0.08$
$r_7 = 3.122$
$\quad d_7 = 0.80 \quad n_4 = 1.6968 \quad \nu_4 = 55.52$
$r_8 = -1.136$
$\quad d_8 = 0.28 \quad n_5 = 1.78472 \quad \nu_5 = 25.71$
$r_9 = 17.369$ $f = 1, \ m = 1.390, \ \dfrac{f}{|r_a|} = 0.881$ $f\left\{\dfrac{1}{f_1} + (n_0 - 1)\dfrac{1}{r_0}\right\} = -0.920$ wherein the reference symbols denote as defined below:

$r_1$ through $r_9$: radii of curvature of respective lens elements $d_1$ through $d_8$: thickness of respective lens elements and airspace $n_1$ through $n_5$: refractive indices of respective lens elements $\nu_1$ through $\nu_5$: Abbe's numbers of respective lens elements

Embodiment 9

$r_1 = \infty$
$\quad d_1 = 0.28 \quad n_1 = 1.51633 \quad \nu_1 = 64.15$
$r_2 = 0.891$
$\quad d_2 = 0.42$
$r_3 = \infty$
$\quad d_3 = 3.20 \quad n_2 = 1.8061 \quad \nu_2 = 40.92$
$r_4 = \infty$
$\quad d_4 = 0.62$
$r_5 = -24.504$
$\quad d_5 = 0.46 \quad n_3 = 1.6968 \quad \nu_3 = 55.62$
$r_6 = -2.315$
$\quad d_6 = 0.09$
$r_7 = 1.952$
$\quad d_7 = 0.74 \quad n_4 = 1.62041 \quad \nu_4 = 60.27$
$r_8 = -1.745$
$\quad d_8 = 0.23 \quad n_5 = 1.78472 \quad \nu_5 = 25.71$
$r_9 = -4.107$
$\quad d_9 = 0.70$
$r_{10} = -1.804$
$\quad d_{10} = 0.23 \quad n_6 = 1.84666 \quad \nu_6 = 23.88$
$r_{11} = -3.097$ $f = 1, \ m = 1.708, \ \dfrac{f}{|r_a|} = 0.573$ $f\left\{\dfrac{1}{f_1} + (n_0 - 1)\dfrac{1}{r_0}\right\} = -0.608$ wherein the reference symbols denote as defined below:

$r_1$ through $r_{11}$: radii of curvature of respective lens elements $d_1$ through $d_{10}$: thickness of respective lens elements and airspace $n_1$ through $n_6$: refractive indices of respective lens elements $\nu_1$ through $\nu_6$: Abbe's numbers of respective lens elements Of the embodiments described above, embodiments 1, 4, 5 and 7 exemplify objectives for use with endoscopes for side viewing or oblique viewing. In these embodiments, therefore, a prism is arranged between the front diverging lens group and the rear converging lens group, and the reference symbol $n_0$ represents $n_3$, the reference symbol $r_0$ denotes $r_5$, the reference symbol $r_0'$ represents $r_6$ and the reference symbol $r_a$ designates $r_8$. In the embodiments 2 and 6, the reference symbol $n_0$ represents $n_2$, reference symbol $r_0$ denotes $r_3$, the reference symbol $r_0'$ represents $r_4$ and the reference symbol $r_a$ designates $r_6$. The embodiment 3 exemplifies an objective wherein two prisms are arranged between the front diverging lens group and the rear converging lens group, and the reference symbol $n_0$ represents $n_4$, the reference symbol $r_0$ denotes $r_7$, the reference symbol $r_0'$ represents $r_8$ and the reference symbol $r_a$ designates $r_{10}$. The embodiment 8 exemplifies an objective wherein a positive lens is additionally arranged as a component of the rear converging lens group on its object side, and the reference symbol $n_0$ represents $n_2$, the reference symbol $r_0$ denotes $r_3$, the reference symbol $r_0'$ represents $r_4$ and the reference symbol $r_a$ designates $r_8$. Finally, the embodiment 9 shows an objective wherein a negative meniscus lens is additionally arranged as a component of the rear converging lens group on its image side and, further, a prism is arranged between the front diverging lens group and the rear converging lens group. In this embodiment, therefore, the reference symbol $n_0$ represents $n_3$, the reference symbol $r_0$ denotes $r_5$, the reference symbol $r_0'$ represents $r_6$ and the reference symbol $r_a$ designates $r_8$.

Figure 18A:
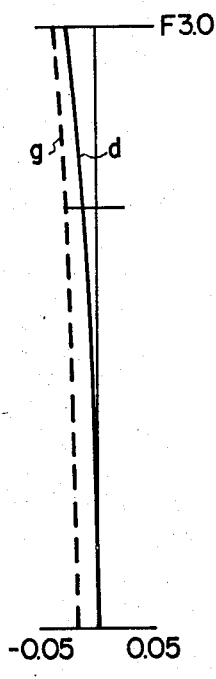
FIG. 18A through FIG. 18E show curves illustrating the aberration characteristic of the embodiment 9.
Figure 18B:
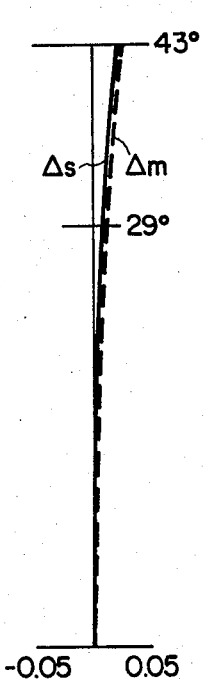
Figure 18C:
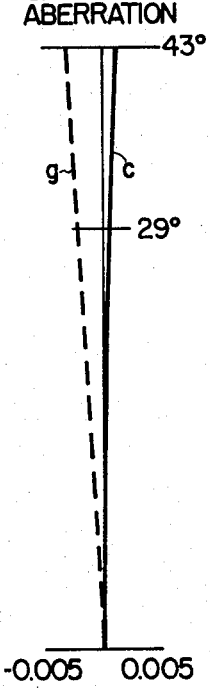
Figure 18D:
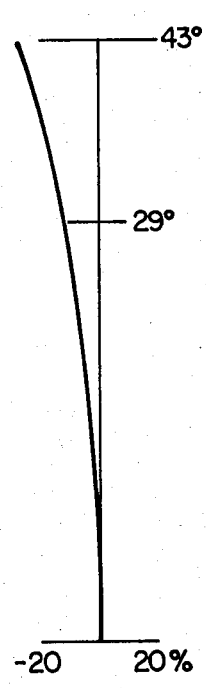
Figure 18E:
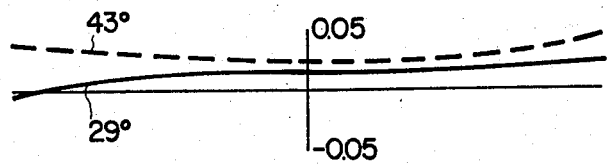

The aberration characteristics of these embodiments are illustrated in FIG. 10A through FIG. 18E.

As is easily understood from the foregoing descriptions, the retrofocus-type objective for endoscopes according to the present invention makes it possible to obtain a small angle of incidence on an image fiber bundle while its front concave lens can offer a wide angle. Further, the objective according to the present invention allows to arrange a stop at the back of the front lens though a stop must be located in front of the lens system in the conventional objective for endoscopes.

Furthermore, the objective according to the present invention has a very compact configuration which can sufficiently be accommodated in thin distal ends of endoscopes. In addition, the present invention makes it possible to arrange prism between the front concave lens and the rear lens group since a certain space is reserved between the front and rear lens groups in a retrofocus-type objective. Such prisms arranged in said space can offer an advantage that its refractive action is effective for preparing parallel rays to be incident on the end face of an image fiber bundle.

We claim:

1. A retrofocus-type objective for endoscopes comprising a front diverging lens group comprising a lens having negative refractive power and a rear converging lens group comprising a positive lens and a positive cemented doublet lens whose cemented surface has negative refractive power, and said objective satisfying the following conditions:

$$|r_0| > |r_0'| \quad (1)$$

$$0.8 \leq m \leq 2.5 \quad (2)$$

$$0.5 \leq |f\{1/f + (n_o - 1)/r_o\}| \leq 1.0 \quad (3)$$

$$0.5 \leq f/|r_a| \leq 1.2 \quad (4)$$

wherein the reference symbol $m$ represents the ratio of the total focal length of the rear converging lens group relative to the total focal length of the entire objective system as a whole, the reference symbol $f_1$ denotes the focal length of the front converging lens group, the reference symbol $f$ designates the total focal length of the objective system as a whole, the reference symbol $n_0$ represents refractive index of the positive lens located on the object side of the rear converging lens group, the reference symbols $r_0$ and $r_0'$ denote radii of curvature of the front and rear surfaces respectively of the positive lens located on the object side of the rear converging lens group and the reference symbol $r_a$ designates radius of curvature on the cemented surface of the cemented lens of the rear converging lens group.

2. A retrofocus-type objective for endoscopes according to claim 1 wherein an aperture stop is arranged between said front diverging lens group and said rear converging lens group.

3. A retrofocus-type objective for endoscopes according to claim 1 wherein a positive lens is additionally arranged on the object side of said rear converging lens group as a component of said rear lens group.

4. A retrofocus-type objective for endoscopes according to claim 1 wherein a negative meniscus lens is additionally arranged on the image side of said converging rear lens group as a component of said rear lens group.

5. A retrofocus-type objective for endoscopes comprising a front diverging lens group comprising a negative lens, a prism and a rear converging lens group comprising a positive lens and a positive cemented doublet lens, and said objective having the following numerical data:

$r_1 = \infty$
$\quad d_1 = 0.37 \quad n_1 = 1.51633 \quad \nu_1 = 64.15$
$r_2 = 0.641$
$\quad d_2 = 0.21$
$r_3 = \infty$
$\quad d_3 = 1.60 \quad n_2 = 1.8061 \quad \nu_2 = 40.92$
$r_4 = \infty$
$\quad d_4 = 0.50$
$r_5 = \infty$
$\quad d_5 = 0.53 \quad n_3 = 1.69680 \quad \nu_3 = 55.62$
$r_6 = -1.559$
$\quad d_6 = 0.11$
$r_7 = 3.155$
$\quad d_7 = 0.80 \quad n_4 = 1.62041 \quad \nu_4 = 60.27$
$r_8 = -1.084$
$\quad d_8 = 0.27 \quad n_5 = 1.78472 \quad \nu_5 = 25.71$
$r_9 = -3.226$ $f = 1, m = 1.485, \dfrac{f}{|r_a|} = 0.922$ $f\left\{\dfrac{1}{f_1} + (n_0 - 1)\dfrac{1}{r_0}\right\} = -0.806$ 6. A retrofocus-type objective for endoscopes comprising a front lens group comprising a negative lens and a rear converging lens group comprising a positive lens and a positive cemented doublet lens, and said objective having the following numerical data:

$r_1 = \infty$
$\quad d_1 = 0.37 \quad n_1 = 1.51633 \quad \nu_1 = 64.15$
$r_2 = 1.13$
$\quad d_2 = 0.36$
$r_3 = -2.294$
$\quad d_3 = 0.60 \quad n_2 = 1.757 \quad \nu_2 = 47.87$
$r_4 = -0.816$
$\quad d_4 = 0.20$
$r_5 = \infty$
$\quad d_5 = 0.35 \quad n_3 = 1.84666 \quad \nu_3 = 23.88$
$r_6 = 1.13$
$\quad d_6 = 0.61 \quad n_4 = 1.788 \quad \nu_4 = 47.49$
$r_7 = -1.564$ $f = 1, m = 1.03, \dfrac{f}{|r_a|} = 0.883$ $f\left\{\dfrac{1}{f_1} + (n_0 - 1)\dfrac{1}{r_0}\right\} = -0.789$ 7. A retrofocus-type objective for endoscopes comprising a front diverging lens group comprising a negative lens, two prisms and a rear converging lens group comprising a positive lens and a positive cemented doublet lens, and said objective having the following numerical data:

$r_1 = \infty$
$\quad d_1 = 0.199 \quad n_1 = 1.51633 \quad \nu_1 = 64.1$
$r_2 = 0.924$
$\quad d_2 = 0.266$
$r_3 = \infty$
$\quad d_3 = 1.594 \quad n_2 = 1.8061 \quad \nu_2 = 40.9$
$r_4 = \infty$
$\quad d_4 = 0.066$
$r_5 = \infty$
$\quad d_5 = 1.461 \quad n_3 = 1.8061 \quad \nu_3 = 40.9$
$r_6 = \infty$
$\quad d_6 = 0.946$
$r_7 = \infty$
$\quad d_7 = 0.664 \quad n_4 = 1.6968 \quad \nu_4 = 55.5$
$r_8 = -2.716$ -continued $d_8 = 0.133$
$r_9 = 2.59$
$\quad d_9 = 0.996 \quad n_5 = 1.62041 \quad \nu_5 = 60.3$
$r_{10} = -1.454$
$\quad d_{10} = 0.332 \quad n_6 = 1.78472 \quad \nu_6 = 25.7$
$r_{11} = -4.343$ $f = 1, m = 1.926, \dfrac{f}{|r_a|} = 0.688$ $f\left\{\dfrac{1}{f_1} + (n_0 - 1)\dfrac{1}{r_0}\right\} = -0.599$ 8. A retrofocus-type objective for endoscopes comprising a front diverging lens group comprising a negative lens, a prism and a rear converging lens group comprising a positive lens and a positive cemented doublet lens, and said objective having the following numerical data:

$r_1 = \infty$
$\quad d_1 = 0.66 \quad n_1 = 1.51633 \quad \nu_1 = 64.15$
$r_2 = 1.126$
$\quad d_2 = 0.46$
$r_3 = \infty$
$\quad d_3 = 4.04 \quad n_2 = 1.8061 \quad \nu_2 = 40.92$
$r_4 = \infty$
$\quad d_4 = 0.60$
$r_5 = -4.989$
$\quad d_5 = 0.77 \quad n_3 = 1.6968 \quad \nu_3 = 55.52$
$r_6 = -2.125$
$\quad d_6 = 0.17$
$r_7 = 2.066$
$\quad d_7 = 1.17 \quad n_4 = 1.62041 \quad \nu_4 = 60.27$
$r_8 = -1.6$
$\quad d_8 = 0.37 \quad n_5 = 1.84666 \quad \nu_5 = 23.88$
$r_9 = -5.707$ $f = 1, m = 1.960, \dfrac{f}{|r_a|} = 0.625$ $f\left\{\dfrac{1}{f_1} + (n_0 - 1)\dfrac{1}{r_0}\right\} = -0.598.$ 9. A retrofocus-type objective for endoscopes comprising a front diverging lens group comprising a negative lens, a prism and a rear converging lens group comprising a positive lens and a positive cemented doublet lens, and said objective having the following numerical data:

$r_1 = \infty$
$\quad d_1 = 0.52 \quad n_1 = 1.51633 \quad \nu_1 = 64.15$
$r_2 = 0.930$
$\quad d_2 = 0.22$
$r_3 = \infty$
$\quad d_3 = 3.13 \quad n_2 = 1.83481 \quad \nu_2 = 42.82$
$r_4 = \infty$
$\quad d_4 = 0.96$
$r_5 = 137.877$
$\quad d_5 = 0.74 \quad n_3 = 1.69680 \quad \nu_3 = 55.62$
$r_6 = -2.505$
$\quad d_6 = 0.15$
$r_7 = 2.505$
$\quad d_7 = 1.11 \quad n_4 = 1.62041 \quad \nu_4 = 60.27$
$r_8 = -1.419$
$\quad d_8 = 0.37 \quad n_5 = 1.78472 \quad \nu_5 = 25.71$
$r_9 = -5.122$ $f = 1, m = 1.895, \dfrac{f}{|r_a|} = 0.705$ $f\left\{\dfrac{1}{f_1} + (n_0 - 1)\dfrac{1}{r_0}\right\} = -0.550.$ 10. A retrofocus-type objective for endoscopes comprising a front lens group comprising a negative lens and a rear converging lens group comprising a positive lens and a positive cemented doublet lens, and said objective having the following numerical data:

$r_1 = 13.908$
$\quad d_1 = 0.32 \quad n_1 = 1.51633 \quad \nu_1 = 64.15$
$r_2 = 2.111$
$\quad d_2 = 0.92$
$r_3 = -1.366$
$\quad d_3 = 0.69 \quad n_2 = 1.757 \quad \nu_2 = 47.87$
$r_4 = -1.042$
$\quad d_4 = 0.09$
$r_5 = 3.688$
$\quad d_5 = 0.32 \quad n_3 = 1.84666 \quad \nu_3 = 23.88$
$r_6 = 0.883$
$\quad d_6 = 0.78 \quad n_4 = 1.788 \quad \nu_4 = 47.49$
$r_7 = -1.831$ $f = 1, m = 1.116, \dfrac{f}{|r_a|} = 1.132$ $f\left\{\dfrac{1}{f_1} + (n_0 - 1)\dfrac{1}{r_0}\right\} = -0.760.$ 11. A retrofocus-type objective for endoscopes comprising a front diverging lens group comprising a negative lens, a prism and a rear converging lens group comprising a positive lens and a positive cemented doublet lens, and said objective having the following numerical data:

$r_1 = \infty$
$\quad d_1 = 0.28 \quad n_1 = 1.51633 \quad \nu_1 = 64.15$
$r_2 = 1.040$
$\quad d_2 = 0.37$
$r_3 = \infty$
$\quad d_3 = 3.33 \quad n_2 = 1.8061 \quad \nu_2 = 40.92$
$r_4 = \infty$
$\quad d_4 = 0.79$
$r_5 = -60.625$
$\quad d_5 = 0.46 \quad n_3 = 1.6968 \quad \nu_3 = 55.62$
$r_6 = -2.543$
$\quad d_6 = 0.09$
$r_7 = 2.964$
$\quad d_7 = 0.74 \quad n_4 = 1.62041 \quad \nu_4 = 60.27$
$r_8 = -1.419$
$\quad d_8 = 0.23 \quad n_5 = 1.84666 \quad \nu_5 = 23.88$
$r_9 = -3.043$ $f = 1, m = 1.828, \dfrac{f}{|r_a|} = 0.705$ $f\left\{\dfrac{1}{f_1} + (n_0 - 1)\dfrac{1}{r_0}\right\} = -0.508.$ 12. A retrofocus-type objective for endoscopes comprising a front diverging lens group comprising a negative lens and a rear converging lens group comprising two positive lenses and a positive cemented doublet lens, and said objective having the following numerical data:

$r_1 = 2.763$
$\quad d_1 = 0.28 \quad n_1 = 1.51633 \quad \nu_1 = 64.15$
$r_2 = 0.580$
$\quad d_2 = 1.18$
$r_3 = -2.817$
$\quad d_3 = 0.48 \quad n_2 = 1.6968 \quad \nu_2 = 55.52$
$r_4 = -1.430$
$\quad d_4 = 0.60$
$r_5 = 7.885$
$\quad d_5 = 0.48 \quad n_3 = 1.6968 \quad \nu_3 = 55.52$
$r_6 = -2.338$
$\quad d_6 = 0.08$
$r_7 = 3.122$
$\quad d_7 = 0.80 \quad n_4 = 1.6968 \quad \nu_4 = 55.52$
$r_8 = -1.136$
$\quad d_8 = 0.28 \quad n_5 = 1.78472 \quad \nu_5 = 25.71$
$r_9 = 17.369$ $f = 1, m = 1.390, \dfrac{f}{|r_a|} = 0.881$ $$f\left(\frac{1}{f_1} + (n-1)\frac{1}{r_0}\right) = -0.920.$$

13. A retrofocus-type objective for endoscopes comprising a front diverging lens group comprising a negative lens, a prism and a rear converging lens group comprising a positive lens, a positive cemented doublet lens and a negative meniscus lens, and said objective having the following numerical data:

| | | |
|---|---|---|
| $r_1 = \infty$ | | |
| $d_1 = 0.28$ | $n_1 = 1.51633$ | $\nu_1 = 64.15$ |
| $r_2 = 0.891$ | | |
| $d_2 = 0.42$ | | |
| $r_3 = \infty$ | | |
| $d_3 = 3.20$ | $n_2 = 1.8061$ | $\nu_2 = 40.92$ |
| $r_4 = \infty$ | | |
| $d_4 = 0.62$ | | |
| $r_5 = -24.504$ | | |
| $d_5 = 0.46$ | $n_3 = 1.6968$ | $\nu_3 = 55.62$ |
| $r_6 = -2.315$ | | |
| $d_6 = 0.09$ | | |
| $r_7 = 1.952$ | | |
| $d_7 = 0.74$ | $n_4 = 1.62041$ | $\nu_4 = 60.27$ |
| $r_8 = -1.745$ | | |
| $d_8 = 0.23$ | $n_5 = 1.78472$ | $\nu_5 = 25.71$ |
| $r_9 = -4.107$ | | |
| $d_9 = 0.70$ | | |
| $r_{10} = -1.804$ | | |
| $d_{10} = 0.23$ | $n_6 = 1.84666$ | $\nu_6 = 23.88$ |
| $r_{11} = -3.097$ | | |

$$f = 1, \quad m = 1.708, \quad \frac{f}{|r_a|} = 0.573$$

$$f\left(\frac{1}{f_1} + (n_0 - 1)\frac{1}{r_0}\right) = -0.608.$$

* * * * *